United States Patent [19]
Danish et al.

[11] Patent Number: 5,833,441
[45] Date of Patent: Nov. 10, 1998

[54] WINDSHIELD WIPER WASHER MOTOR FOR USE IN A VEHICLE

[75] Inventors: Peter J. Danish, Scottsville, N.Y.;
Kelvin E. McKinney, Dayton, Ohio;
Richard S. Mullen, Canandaigua, N.Y.

[73] Assignee: ITT Automotive Electrical Systems, Inc., Auburn Hills, Mich.

[21] Appl. No.: 666,040

[22] Filed: Jun. 19, 1996

[51] Int. Cl.[6] .............................. F04B 17/00; F16J 15/16; F02F 11/00

[52] U.S. Cl. ............................... 417/423.14; 417/424.1; 277/14 R; 277/56; 277/27; 277/55

[58] Field of Search ........................... 417/423.14, 424.1; 277/13, 14 R, 56, 55, 153, 53, 155, 27

[56] References Cited

U.S. PATENT DOCUMENTS

| | | | |
|---|---|---|---|
| 3,325,107 | 6/1967 | Peterson | 417/423.1 |
| 3,663,023 | 5/1972 | Leidenfrost | 277/56 |
| 3,701,536 | 10/1972 | Matthews et al. | 277/56 |
| 3,752,603 | 8/1973 | Bunch | 417/423.14 |
| 4,898,518 | 2/1990 | Hubbard et al. | 417/360 |
| 5,259,628 | 11/1993 | Nisley | 277/56 |
| 5,368,312 | 11/1994 | Voit et al. | 277/153 |
| 5,399,075 | 3/1995 | Frank et al. | 417/423.14 |
| 5,480,289 | 1/1996 | Lee | 417/423.14 |

FOREIGN PATENT DOCUMENTS

| | | |
|---|---|---|
| 0027077 | 4/1981 | European Pat. Off. . |
| 0460551 | 12/1991 | European Pat. Off. . |
| 3822897 | 6/1988 | Germany . |
| 3729025 | 3/1989 | Germany . |

OTHER PUBLICATIONS

"Acetal Replaces Metal In Windshield Washer Pump," *Interconnection Technology*, Mar. 1993, p. 8.

"Pumping Up Profits," *Newsline*, undated, 1 pg.

Advertisement on Windshield Washer Pump, *Plastics Design Forum*, Mar./Apr. 1993, p. 60.

"Windshield Washer/Reservoir System," ITT Automotive, undated, 2 pgs.

"Stress Engineering Services, Inc.", Stress Engineering, undated, 9 pgs.

*Primary Examiner*—Bibhu Mohanty
*Attorney, Agent, or Firm*—J. Gordon Lewis; Thomas N. Twomey

[57] ABSTRACT

A system and method for sealing a pressure area in a washer pump is disclosed. The system and method provides designed interference and contact points between a plurality of adjacent walls which are arranged to define a serpentine channel and which are integrally molded into a pump housing and a motor housing. At least one of the plurality of walls becomes biased in response to fluid pressure in a pressure area such that it engages one or more of the plurality of walls in the mating housing to provide at least one seal to seal the pressure area. The walls may be provided with a beveled edge to facilitate providing a "point contact" to enhance sealing. The system and method reduce or entirely eliminate the need for an O-ring between, for example, the pump housing and the motor housing.

11 Claims, 3 Drawing Sheets

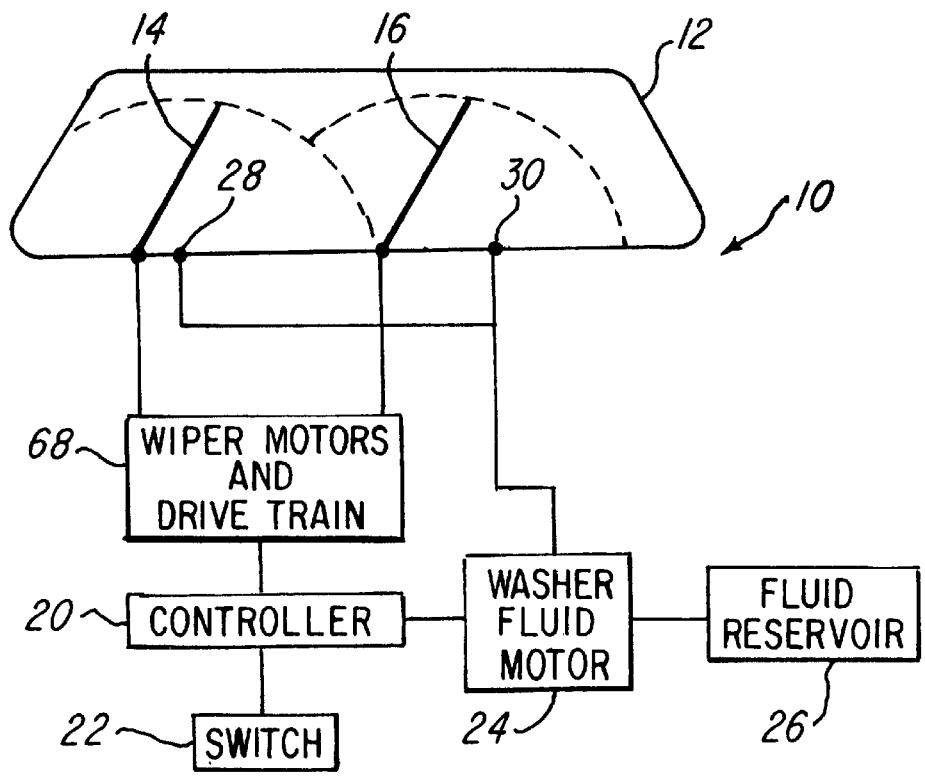
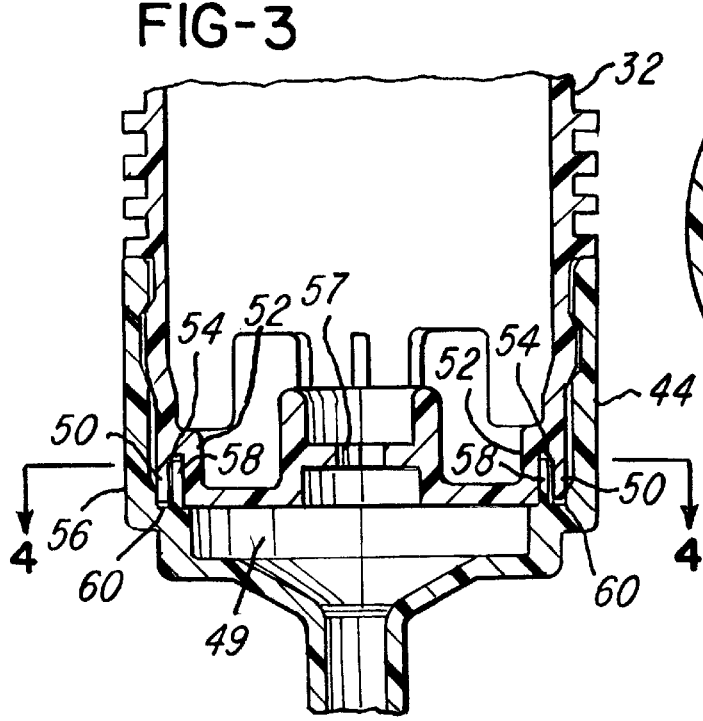
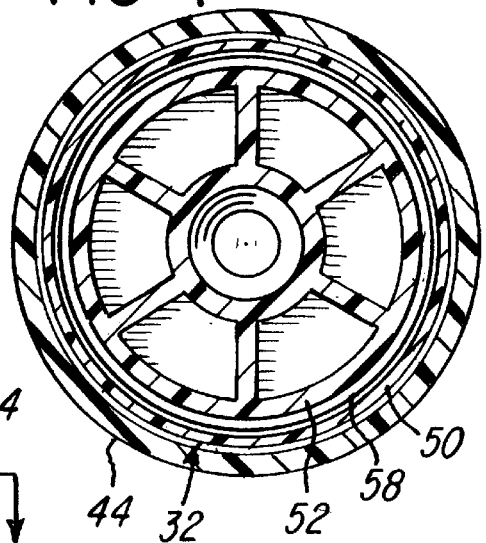

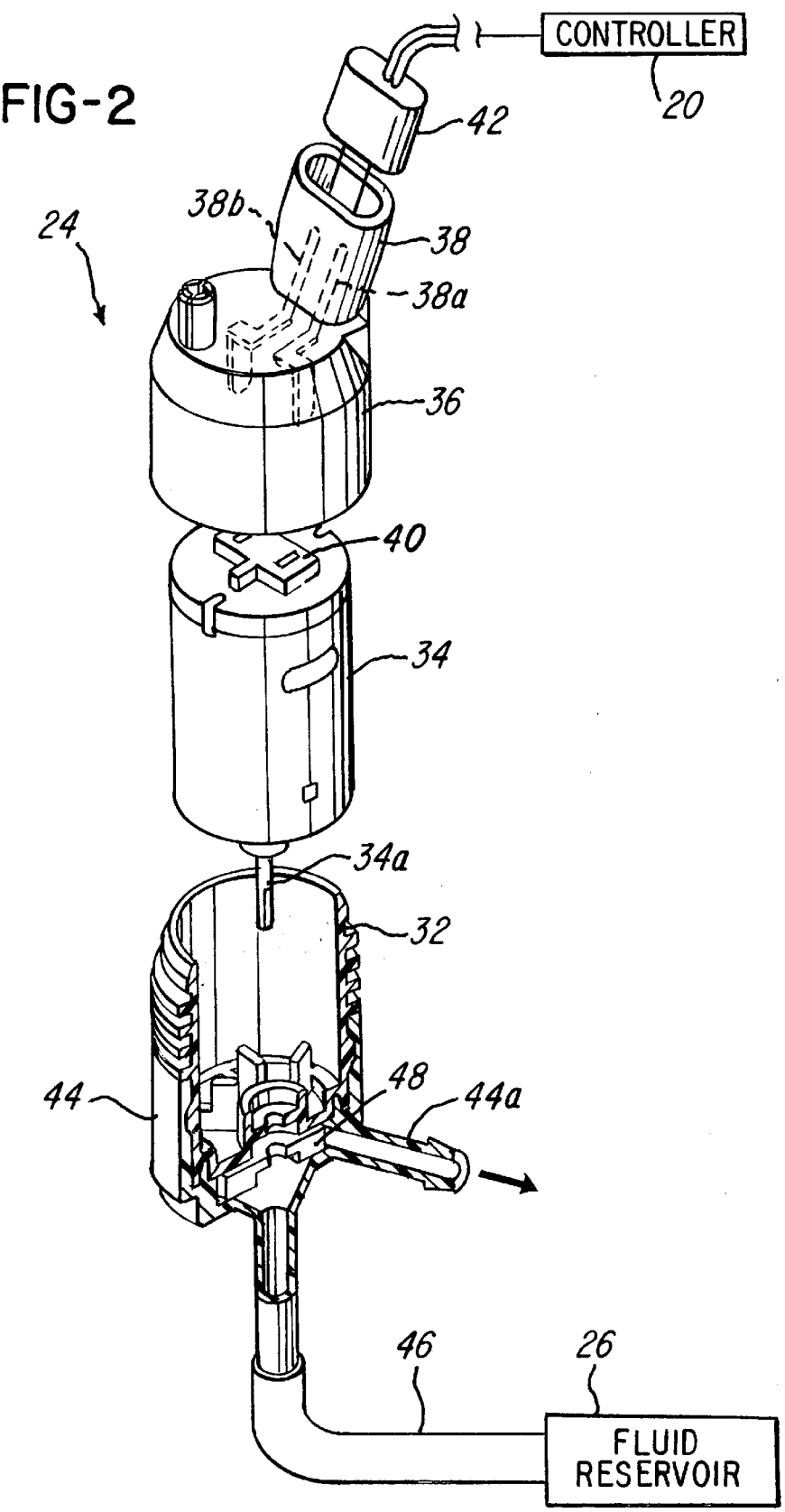

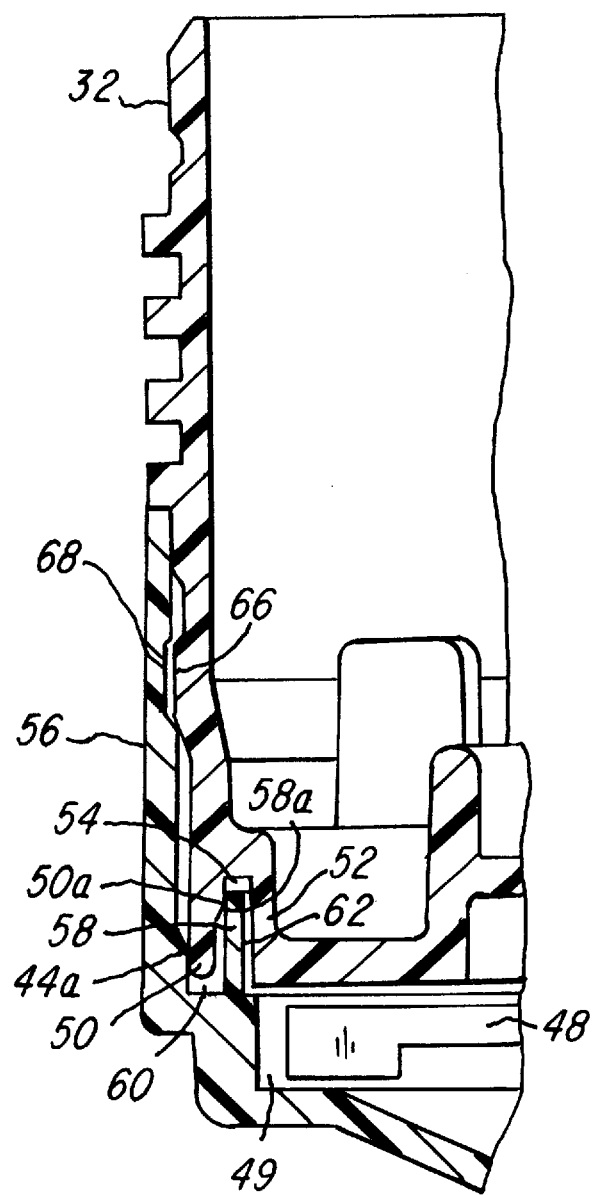

WINDSHIELD WIPER WASHER MOTOR FOR USE IN A VEHICLE

BACKGROUND OF THE INVENTION

1. Field of the Invention

This invention relates to a windshield wiper motor for use in a vehicle and, more particularly, to an improved housing for a windshield wiper washer motor and pump.

2. Description of Related Art

In the past, a mini windshield wiper pump comprised a terminal housing which was mounted to a motor housing assembly which, in turn, was mounted to a pump housing. The motor housing assembly and terminal housing encased an electric DC motor comprising an armature which extended through an end of the motor housing. An impeller was coupled to the armature and became situated in a fluid pressure area between the motor housing assembly and the pump housing.

It was necessary to seal the DC motor from moisture so that fluid pumped by the impeller did not leak into the motor housing assembly and damage the DC motor situated therein. Accordingly, it was necessary to provide an O-ring seal or quad-ring seal around, for example, the armature of the DC motor.

It was also necessary to provide a seal between the pump housing and the motor housing assembly such that fluid did not leak into the motor housing or out of the assembled washer pump. To accomplish this seal, a rubber O-ring seal was typically positioned around the motor housing prior to assembly (i.e., between the pump housing and motor housing assembly).

Unfortunately, the O-ring itself was an additional component which required additional cost and further necessitated additional assembly steps when the washer pump was assembled. Another problem experienced during the assembly process is that the O-ring tended to "roll" on the motor housing or become disoriented when the pump housing was mounted on the motor housing assembly.

What is needed, therefore, is a washer pump which facilitates eliminating the need for an O-ring, which reduces assembly time and which provides suitable sealing for the pressure area between the pump and motor housing.

SUMMARY OF THE INVENTION

A primary object of this invention is to provide a unique system and method which provide designed interference and designed contact between and/or among housing walls to seal a pressure area in a pump.

Another object of this invention is to provide a system and method for sealing a pressure area in a pump by situating a plurality of walls in an adjacent relationship such that when at least one of the walls experiences fluid pressure, it becomes resiliently biased against one or more adjacent walls to provide an interference contact which seals the pressure area.

Another object of this invention is to provide a housing design which is easy to assembly and which facilitates reducing or eliminating an O-ring and one or more assembly steps.

In one aspect, this invention comprises a washer motor housing for use with a washer motor consisting of a motor housing having a motor wall situated at a mating end of the motor housing and a pump housing having a pump wall situated at a mating end of the pump housing, the motor wall and pump wall complementarily mating to provide a seal between the motor housing and the pump housing.

In another aspect this invention comprises a washer motor consisting of a first body comprising a first wall, a second body comprising a second wall, the first and second walls cooperating with each other to provide a seal between a first pressure area associated with the said first body and a second pressure area associated with the second body when the first and second bodies are secured together.

In yet another aspect this invention comprises a washer fluid motor consisting of a first body comprising a pressure wall in communication with a pressure area, a second body comprising a second wall which is situated adjacent the pressure wall when the first and second bodies are coupled together, the pressure wall being resilient such that it deflects into the second wall in response to fluid pressure to provide a primary seal to the pressure area.

In still another aspect this invention comprises a method for sealing a pressure area in a wiper fluid pump consisting of the steps of integrally molding a first wall in a motor housing and a second wall in a pump housing such that, when the motor housing is coupled to the pump housing, the first and second walls become adjacent and the first wall communicates with a pressure area between the motor housing and the pump housing, coupling the motor housing to the pump housing, pressurizing the pressure area such that the first wall becomes biased against the second wall to seal the pressure area, the seal becoming generally tighter as pressure increases against the first wall.

These and other objects and advantages of the invention will be apparent from the following description, the accompanying drawings and the appended claims.

BRIEF DESCRIPTION OF THE DRAWINGS

FIG. 1 is a schematic view of a windshield wiper system according to one embodiment of the present invention;

FIG. 2 is an exploded view of a washer pump utilizing features of the present invention;

FIG. 3 is a fragmentary sectional view illustrating an arrangement of adjacent walls associated with a pump housing and a motor housing;

FIG. 4 is a cross-sectional view illustrating the arrangement of the various housing walls; and FIG. 5 is an enlarged, fragmentary sectional view illustrating a serpentine channel defined by a plurality of walls, as well as a primary seal and a secondary seal.

DETAILED DESCRIPTION OF PREFERRED EMBODIMENT

Referring now to FIG. 1, a windshield wiper system 10 is shown for wiping and cleaning a windshield 12. The windshield wiping system 10 comprises a plurality of windshield wipers 14 and 16 which are driven by suitable wiper motors and wiper drive train 18. The windshield wiper system 10 further comprises a controller 20 for controlling the operation of the wiper system 10 and the wiper motors and drive train 18 in response to actuation of a switch 22 which is positioned, for example, on a turn signal lever (not shown) in a passenger compartment (not shown) of a vehicle (not shown).

The windshield wiper system 10 also comprises a washer fluid motor 24 which is coupled to controller 20. The washer fluid motor 24 pumps washer fluid from a reservoir 26 to output orifices 28 and 30 associated with wiper blades 14 and 16, respectively, in response to a wash signal from controller 20 which is generated when a user actuates switch 22 to a wash cycle position.

FIG. 2 illustrates an exploded fragmentary view of the washer motor 24 in accordance with an embodiment of this invention. The washer motor 24 comprises a motor housing 32 for receiving a DC motor 34. In the embodiment being described, one suitable DC motor is DC motor Part No. 22110058 manufactured by Johnson Electric Co. of Hong Kong. The washer motor 24 further comprises a terminal housing 36 for encasing motor 34 and also for securing it firmly in motor housing 32.

Notice that terminal housing 36 comprises a dual male electrical terminal or connector 38 which provides suitable conductors 38a and 38b which engage the mating female connector 40 on motor 24 in a manner which is conventionally known. The dual male connector 38 also receives a female connector 42 which electrically couples motor 24 to controller 20.

The wiper motor 24 further comprises a pump housing 44 which cooperatively mates with and mounts onto motor housing 32 in a manner described later herein. The pump housing 44 is coupled directly to reservoir 26 which stores washer fluid. Alternatively, the pump housing 44 may be coupled to reservoir 26 via a flexible tubing 46 in a manner which is conventionally known.

As best illustrated in FIG. 2, the washer motor 24 comprises an impeller 48 coupled to an armature 34a of drive motor 34 when the washer motor 24 is assembled. The motor housing 32 comprises an orifice 57 for receiving armature 34a (FIG. 2) of motor 34. In the embodiment being described, the aperture 56 may comprise a rubber O-ring, quad seal or gasket (not shown) for preventing fluid from leaking into motor housing 32.

As best illustrated in FIG. 3, the impeller 48 becomes situated in a pressure area 49 between pump housing 44 and motor housing 32. During operation, fluid from fluid reservoir 26 is introduced and forced through an output orifice 44a to output orifices 28 and 30 (FIG. 1).

As best illustrated in FIGS. 2–4, the motor housing 32 comprises an outer wall 50 and an adjacent inner wall 52 which cooperate to define a generally U-shaped channel 54. The walls 50 and 52 are integrally formed as part of the housing motor 32. It should be appreciated that the wall 50 is laterally resilient to permit wall 50 to be laterally biased.

Likewise, notice that the pump housing 44 comprises an integrally molded outer wall 56 and an adjacent and integrally molded inner wall 58 which cooperate to define a U-shaped channel 60. Notice that the channels 54 and 60 are designed to receive walls 58 and 50, respectively, when the pump housing 44 is mounted to the motor housing 32. After assembly, the walls 50, 52, 56 and 58 cooperate to define a serpentine channel as best shown in FIG. 5.

It should be appreciated that walls 56 and 58 are integrally formed as part of a pump housing 44, and wall 58 is laterally resilient and responsive to fluid pressure from fluid in pressure area 49.

FIG. 4 illustrates a cross-sectional view of the relationship of the adjacent walls. In the embodiment being described, the walls 50, 58, 32 and 44 all have dimensions of about 33 mm, 29.5 mm, 29 mm, and 26.5 mm, respectively.

In this regard, motor 34 is energized by controller 20 to drive impeller 48 to pump fluid from reservoir 26 into and through pressure area 49. Notice that pump wall 58 comprises a beveled edge 58a and housing wall 50 comprises a beveled edge 50a which engage to provide a primary seal as wall 58 becomes biased. Wall 56 comprises a beveled edge 56a which provides a point contact against a backside 50b of wall 50 as wall 50 becomes biased against wall 56 to provide a secondary seal. The wall 58 is resilient and responds to such fluid pressure and moves or is biased laterally against wall 50. Wall 50 may, in turn, become biased against wall 56 of pump housing 44.

FIG. 5 illustrates a fragmentary view of the walls 50, 52, 56 and 58 when they become biased in the manner described.

The motor housing 32 comprises a detent 66 which is received in a recessed portion 68 of wall 44 to detachably secure pump housing 44 to the motor housing 32 when the pump housing 44 is mounted on motor housing 32.

Notice that wall 58 comprises a surface 62 which is in fluid communication with pressure area 49 such that when fluid is pumped into and out of pressure area 49, pressure is applied to surface 62 to bias wall 58 against wall 50 such that the beveled edges 58a and 50a contact or engage to provide a primary seal for sealing pressure area 49. As pressure increases and wall 58 is further biased against wall 50, wall 50 is forced against and engages beveled edge 44a of wall 44 to provide the secondary seal for sealing pressure area 49.

Thus, it should be appreciated that the walls 58 and 50 cooperate to provide a primary and secondary seal for sealing pressure area 49 without the need of O-rings or gaskets. It should further be appreciated that the sealing capacity of the primary and secondary seal varies directly with the pressure in pressure area 49. Thus, as the pressure in pressure area 49 increases, for example, the tightness of the primary and secondary seals also increases.

Advantageously, the system and method of this invention provides designed interference points of contact to provide one or more seals without the need for an O-ring. It should further be appreciated that the method and system also provide a designed serpentine pressure channel which further facilitates achieving a tighter seal.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A windshield wiper fluid motor comprising:
   a motor housing for receiving a windshield washer fluid motor having an armature and an impeller secured to said armature;
   a pump housing for mounting to said motor housing to enclose said impeller in a pressure area between said pump housing and said motor housing;
   a first wall situated on said motor housing; and
   a second wall situated on said pump housing;
   said first wall being resilient such that when said motor housing and said pump housing are coupled together to enclose such windshield washer fluid motor and said impeller that it becomes resiliently biased against said second wall to matingly seal said pressure area in response to fluid pressure in said pressure area without the use of a separate seal gasket.

2. The wiper fluid motor as recited in claim 1 wherein said first wall is generally cylindrical in cross-section.

3. The wiper fluid motor as recited in claim 1 wherein said first wall is generally cylindrical and comprises a diameter or less than 2 inches.

4. The wiper fluid motor as recited in claim 2 wherein said second wall is generally cylindrical in cross-section and comprises a diameter which is larger than a diameter of said first wall.

5. The wiper fluid motor as recited in claim 4 wherein said first wall is generally cylindrical and comprises a diameter or less than 2 inches.

6. The wiper fluid motor as recited in claim 1 wherein said first wall comprises a first interference region and said second wall comprises a second interference region, said first and second interference regions engaging when said first wall is biased against said second wall to create said seal.

7. The washer motor as recited in claim 1 wherein said first and second walls cooperate to define a serpentine channel when said first and second bodies are secured together, said first wall deflecting in response to pressure to seal said serpentine channel in a plurality of locations.

8. The washer motor as recited in claim 1 wherein said first wall cooperates with a first body wall on said first body to define a first channel and said second wall cooperates with a second body wall on said second body to define a second channel, said first and second walls being received in said second and first channels when said first and second bodies are secured together.

9. The washer motor as recited in claim 1 wherein said first and second walls are resilient and deflect to seal said first pressure area from said second pressure area when a pressure is applied to said first wall.

10. The method as recited in claim 7 wherein said molding step further comprises the step of:

integrally molding a first wall having a first interference region and a second wall having a second interference region, said first and second interference regions engaging to provide said seal when fluid pressure is applied in said pressure area.

11. A method for sealing a pressure area in a windshield wiper fluid pump comprising the steps of:

integrally molding a first wall in a windshield wiper motor housing and a second wall in a pump housing such that, when said motor housing is coupled to said pump housing, said first and second walls become adjacent and said first wall communicates with a pressure area between said motor housing and said pump housing;

coupling said motor housing to said pump housing;

pressurizing said pressure area such that said first wall becomes biased against said second wall to seal said pressure area without the use of a separate gasket seal, said seal becoming generally tighter as pressure increases against said first wall.

* * * * *